(12) United States Patent
Laughlin et al.

(10) Patent No.: US 11,600,880 B2
(45) Date of Patent: Mar. 7, 2023

(54) SYSTEM AND METHOD FOR SECURING BATTERY IN AIRCRAFT

(71) Applicant: BETA AIR, LLC, South Burlington, VT (US)

(72) Inventors: James Laughlin, Burlington, VT (US); Raffaello Verna, Creedmoor, NC (US)

(73) Assignee: BETA AIR, LLC, South Burlington, VT (US)

( * ) Notice: Subject to any disclaimer, the term of this patent is extended or adjusted under 35 U.S.C. 154(b) by 382 days.

(21) Appl. No.: 17/008,721

(22) Filed: Sep. 1, 2020

(65) Prior Publication Data

US 2022/0069268 A1 Mar. 3, 2022

(51) Int. Cl.
*H01M 50/20* (2021.01)
*B64D 27/24* (2006.01)
*B60L 53/80* (2019.01)

(52) U.S. Cl.
CPC ............ *H01M 50/20* (2021.01); *B64D 27/24* (2013.01); *B60L 53/80* (2019.02); *B64C 2201/042* (2013.01)

(58) Field of Classification Search
CPC .. H01M 50/20; H01M 50/244; H01M 50/249; H01M 50/262; H01M 2220/20; B64C 2201/042; B64C 29/00; B60L 53/80; B64D 27/24
See application file for complete search history.

(56) References Cited

U.S. PATENT DOCUMENTS

| | | | | |
|---|---|---|---|---|
| 2,439,464 A | * | 4/1948 | Good | B64D 47/00 244/129.1 |
| 4,013,136 A | * | 3/1977 | Fear | H01M 50/20 180/68.5 |
| 4,435,486 A | * | 3/1984 | Pomaro | H01M 50/20 429/1 |

(Continued)

FOREIGN PATENT DOCUMENTS

| | | |
|---|---|---|
| CN | 204732455 U | 10/2015 |
| EP | 3087625 B1 | 9/2018 |

(Continued)

OTHER PUBLICATIONS http://redaviation.aero/fishpole-hoist/.

*Primary Examiner* — Medhat Badawi
(74) *Attorney, Agent, or Firm* — Caldwell Intellectual Property Law

(57) ABSTRACT

A system for rapid securement and disengagement of a battery assembly-type power source element is provided herein. The system can include a battery assembly that includes a battery element having opposite, opposing surfaces and configured to provide power to at least a portion of a vehicle. On the surface of the battery assembly a pin element can be disposed. The system also includes a receiver assembly configured to mechanically couple the battery assembly. The receiver assembly can include an insertion opening having a size configured to receive the battery assembly and a hook assembly. The hook assembly can include a hook configured to mechanically couple to the pin element of the battery assembly and shaft configured to drive the hook such that a distance between the insertion opening and the battery assembly is changed.

20 Claims, 5 Drawing Sheets

(56) References Cited

U.S. PATENT DOCUMENTS

| | | | |
|---|---|---|---|
| 6,997,724 B2* | 2/2006 | Earl | H01R 11/284 |
| | | | 439/133 |
| 7,413,045 B2* | 8/2008 | Tien | B60R 16/04 |
| | | | 429/96 |
| 8,517,132 B2* | 8/2013 | Heichal | H01M 50/204 |
| | | | 180/68.5 |
| 8,689,918 B2* | 4/2014 | Yu | H01M 50/244 |
| | | | 180/68.5 |
| 8,905,171 B2* | 12/2014 | Lee | B60L 50/60 |
| | | | 180/68.5 |
| 8,978,804 B2* | 3/2015 | Okada | B60L 50/64 |
| | | | 180/68.5 |
| 9,070,923 B2* | 6/2015 | Yu | H01M 50/256 |
| 9,461,282 B2* | 10/2016 | Gee, II | H01M 50/264 |
| 9,716,257 B2* | 7/2017 | Kong | H01M 50/267 |
| 9,991,825 B1* | 6/2018 | Ackerman | H02P 7/06 |
| 10,183,563 B2* | 1/2019 | Rayner | B60L 50/64 |
| 2013/0156533 A1* | 6/2013 | Yu | H01M 50/256 |
| | | | 414/729 |
| 2013/0221918 A1* | 8/2013 | Hill | H02J 7/34 |
| | | | 320/109 |
| 2013/0343842 A1* | 12/2013 | Yu | B60L 53/37 |
| | | | 414/277 |
| 2017/0297738 A1* | 10/2017 | von Flotow | B64C 39/024 |
| 2018/0093768 A1* | 4/2018 | Castleman | B64C 39/024 |
| 2018/0327093 A1* | 11/2018 | von Flotow | B64C 27/10 |
| 2019/0140231 A1* | 5/2019 | Huang | B60K 1/04 |
| 2021/0237901 A1* | 8/2021 | von Flotow | B64F 1/0295 |
| 2022/0069268 A1* | 3/2022 | Laughlin | B64C 29/00 |

FOREIGN PATENT DOCUMENTS

| | | |
|---|---|---|
| GB | 2432878 A | 6/2007 |
| KR | 102030029 B1 | 11/2019 |
| WO | 2012160407 | 11/2012 |

* cited by examiner

SYSTEM AND METHOD FOR SECURING BATTERY IN AIRCRAFT

FIELD OF INVENTION

The present invention generally relates to the field of aircraft and aircraft components. In particular, the present invention is directed to a latching system for aligning and securing a battery pack into an aircraft body.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of energy efficiency and ease of maintenance. The latter is particularly problematic as it compounds the already daunting challenges to maintainers and pilots attempting to adjust to a rapidly evolving and increasingly unfamiliar form of aircraft.

SUMMARY OF DISCLOSURE

In an aspect, a system for rapid securement and disengagement of a battery assembly-type power source element for an electric vertical take-off and landing (eVTOL) aircraft is disclosed. The system can include a battery assembly configured to mechanically couple to an eVTOL aircraft. The battery assembly can include a battery element having opposite, opposing surfaces and configured to provide power to at least a portion of the eVTOL aircraft. The battery assembly can also include a pin element disposed on a surface of the battery assembly. The system can also include a receiver assembly disposed on the eVTOL aircraft and configured to mechanically couple the battery assembly to the eVTOL aircraft. The receiver assembly can include an insertion opening disposed a distance away from the battery assembly and having a size configured to receive the battery assembly. Further, the receiver assembly can include a hook assembly comprising a hook configured to mechanically couple to the pin element of the battery assembly. The hook assembly can also include a cam mechanically coupled to the hook and a shaft mechanically coupled to the cam. The shaft can be configured to drive the hook such that the distance between the insertion opening and the battery assembly is changed.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Aspects of the present disclosure describe a system for securing, engaging, and disengaging a power source for an eVTOL aircraft. In an embodiment, the assembly may provide the ability to manually or automatedly engage and/or disengage a battery assembly to connect or disconnect electric power to at least a portion of an eVTOL aircraft for maintenance safety. In an embodiment, the battery assembly can include a battery element and a pin element disposed in or on a surface of the battery assembly. The pin element can be configured to support at least the weight of the battery assembly. In an embodiment, a receiver assembly is disposed in or on an eVTOL aircraft and can include an insertion opening. The insertion opening can be configured to receive at least a portion of the battery assembly so that the battery assembly is electronically coupled to an integral circuit. In this way, the integral circuit can transfer electric power from the battery assembly to at least a portion of an eVTOL aircraft.

In embodiments, the receiver assembly comprises an insertion opening, a guide plate assembly, a hook assembly, and an integral circuit. The insertion opening and guide plate assembly can be configured to allow the battery assembly to be inserted into receiver assembly in only an orientation sufficient to convey electric power through the integral circuit from battery assembly. The receiver assembly can also include a hook assembly configured to capture the pin element on the surface of the battery assembly element. The hook assembly can be mechanically coupled to a cam, which has a cam profile, a cam profile comprising a non-radially symmetric cross section. The cam is further mechanically coupled to a shaft element which is rotatable about an axis running along the length of the shaft. The shaft can be configured to be manually or automated rotated which in turn rotates the cam. Due to cam profile, as the cam rotates the hook, it is mechanically actuated to retain the pin element and draw the battery assembly element further into the receiver assembly. As the battery assembly element enters the receiver assembly, the battery assembly can electronically couple to the integral electric circuit.

Figure 1:
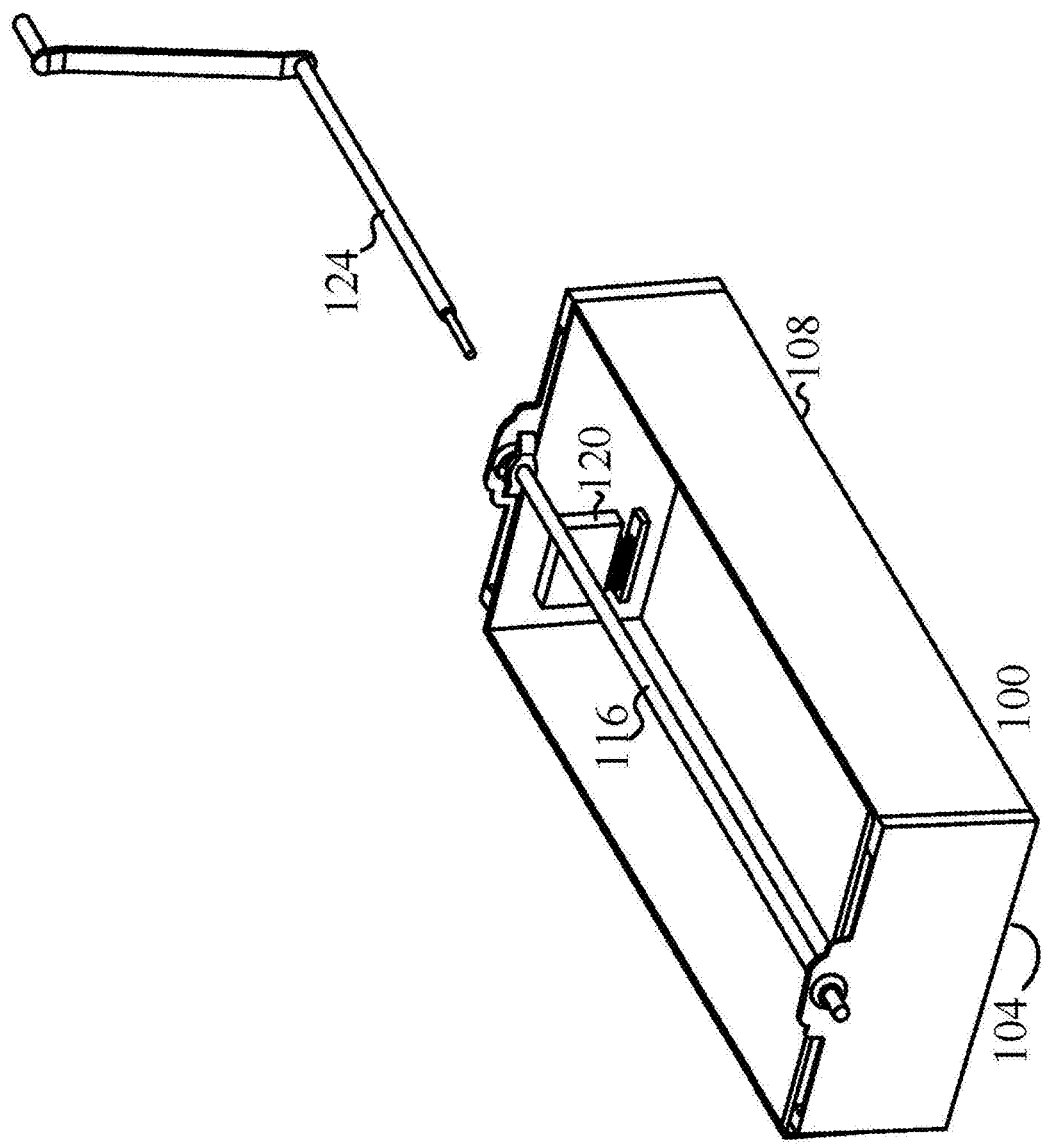
FIG. 1 is an isometric view illustrating an embodiment of a receiver assembly, according to embodiments.

Referring now to FIG. 1, an isometric view illustrating receiver assembly 100 is presented, according to embodiments. In embodiments, receiver assembly 100 may be disposed in or on and eVTOL aircraft and can comprise insertion opening 104, guide plate assembly 108, hook assembly (not illustrated but discussed in detail below with reference to FIG. 4), shaft assembly 116, integral circuit 120, crank 124, or any combination thereof. According to embodiments, receiver assembly 100 can have a shape comprising one or more sides, angles, and/or faces. In embodiments, each side of receiver assembly 100 can include opposite, opposing surfaces with a thickness between them. For each side, one surface may form an inner wall of receiver assembly 100 and an opposite, opposing surface may form an outer wall of receiver assembly 100.

For the purposes of this paper, a coordinate system is required to be established. In embodiments, the direction captured by the axis orthogonal to the receiver assembly's 100 opening may be described as "in" and "out". The direction along said axis toward the receiver assembly 100 can be described as going "in" to the receiver assembly 100, and the opposite direction, or going farther away from receiver assembly 100 can be described as "out".

According to embodiments, the receiver assembly 100 can be configured to align, encapsulate, and secure at least a portion of an integral circuit 120 which can be configured to provide electric power to at least a portion of the eVTOL aircraft. Further, receiver assembly 100 allows for rapid engagement and disengagement of electrical power to at least a portion of the eVTOL aircraft by coupling/uncoupling a battery assembly from the integral circuit 120 via shaft assembly 116 and crank 124. It should be noted that the illustration in FIG. 1 is only an example embodiment of receiver assembly 100 in which shaft assembly 116 is manually actuated with crank 124, however this arrangement does not preclude automated actuation. Receiver assembly 100 may comprise, in part or in whole, but is not limited to aluminum, titanium, steel, plastics such as high-density polyethylene (HDPE), carbon fiber and/or any combination thereof or an undisclosed material, alone or in or combination.

In embodiments, insertion opening 104 comprises a hole, or gap, in receiver assembly 100 and has a shape that is configured to receive at least a portion of a battery assembly. As an example, receiver element 100 may comprise a rectangular prism with at least one of the largest faces missing which may comprise insertion opening 104. Here, insertion opening 104 can be configured to receive at least a portion of a battery assembly and comprises a shape that can accept at least a portion of the battery assembly when the battery assembly is correctly aligned with receiver assembly 100. According to embodiments, insertion opening 104 has a shape that is configured to allow a battery assembly to be inserted in a correct alignment such that electric power may be conveyed to at least a part of the eVTOL aircraft from the battery assembly via integral circuit 120, colloquially known as poka-yoke features. For example, the correct alignment can be achieved when the terminals of a battery assembly are aligned with integral circuit 120 terminals. In this way, only while in the correct alignment a battery assembly can be electrically coupled to integral circuit 120 and thus provide power to at least a portion of the eVTOL aircraft. In embodiments, receiver assembly 100 may have a plurality of general shapes, corresponding to at least a portion of the battery assembly.

According to embodiments, guide plate assembly 108 aligns a battery assembly within receiver assembly 100. For example, guide plate assembly 108 can be configured to orient and align a battery assembly so that a portion of the battery assembly can be received by insertion opening 104. Further, guide plate assembly 108 can be configured to align the battery assembly so that when a portion of the battery assembly is received by insertion opening 104, the battery assembly is electronically coupled to integral circuit 120, and can provide electrical power to at least a portion of an eVTOL aircraft.

In embodiments, guide plate assembly 108 can include a recessed channel that can be configured to align and orient a battery assembly as it is received by insertion opening 104. The recessed channel of guide plate assembly 108 may be configured to align and secure a battery assembly in the correct alignment so that battery assembly may be received by insertion opening 104. In embodiments, the recessed channel can be disposed on or in an interior wall of receiver assembly 100. According to embodiments, the recessed channel can comprise a width at a first end of insertion opening 104 and a second, narrower width at a point a distance away from insertion opening 104 in line with the first end. In embodiments, the width of the recessed channel may decrease between the first and second points of guide plate assembly 108.

In embodiments, the recessed channel of guide plate assembly 108 can be configured to receive a complementary boss disposed on a battery assembly. In embodiments, as a battery assembly is further received by insertion opening 104, the recessed channel's width can narrow and secure around the complementary boss disposed on the battery assembly. In this way, the battery assembly can only be inserted in a correct alignment that inserts the complementary boss into guide plate assembly 108. Guide plate assembly 108 may comprise, but is not limited to aluminum, titanium, steel, plastics such as high-density polyethylene (HDPE), carbon fiber and/or any combination thereof or an undisclosed material or combination.

Figure 4:
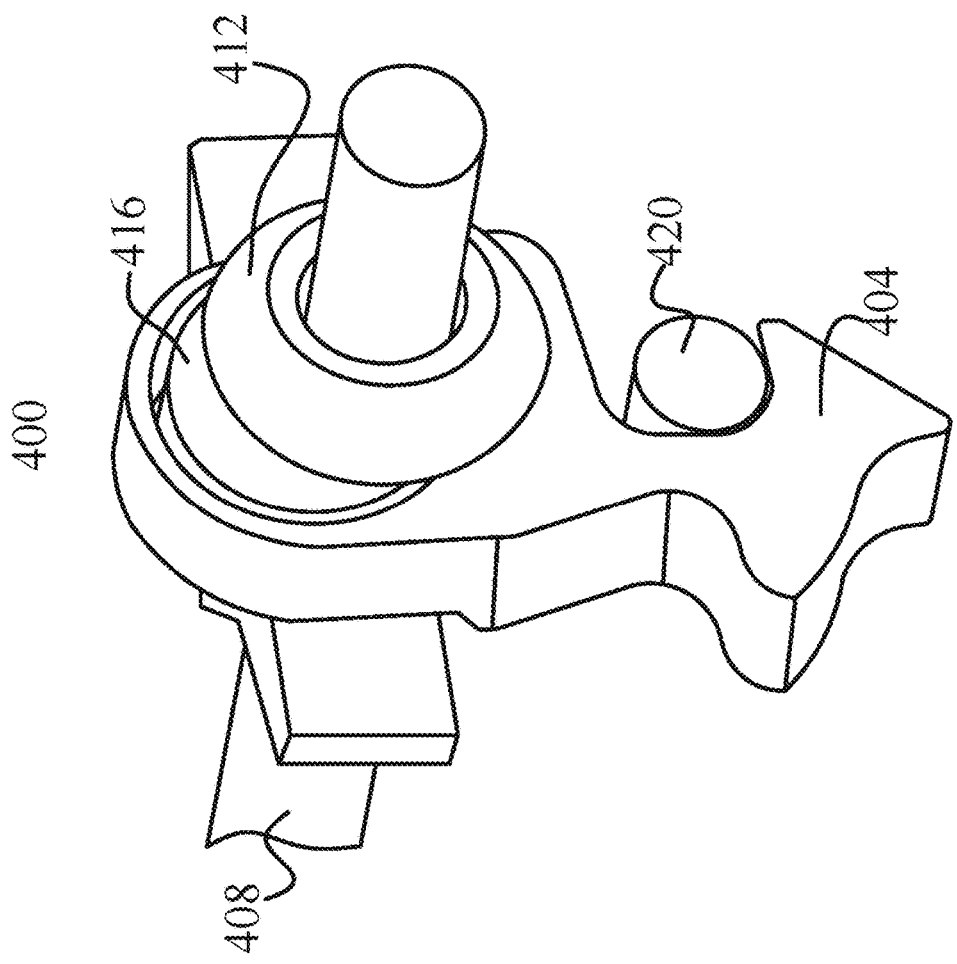
FIG. 4 is an isometric view of a hook assembly, according to embodiments.
Figure 5:
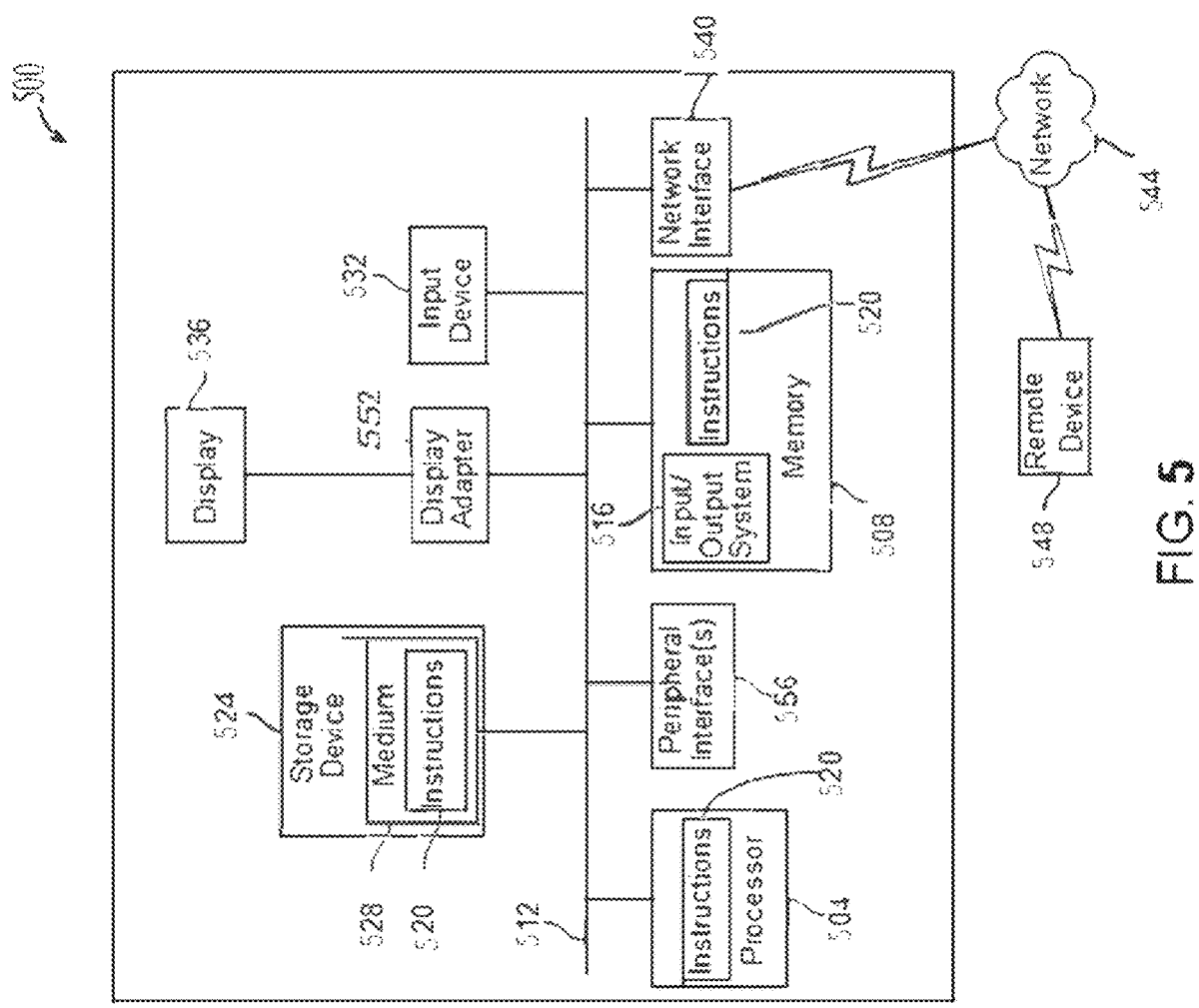
FIG. 5 is a block diagram illustrating a computing device in the example form of a computer system, according to embodiments.

In an embodiment, receiver assembly 100 may comprise a hook assembly, unillustrated and discussed in further detail below with reference to FIG. 4. In embodiments, the hook assembly is secured and/or mechanically coupled to a portion of receiver assembly 100 a distance away from insertion opening 104. The hook assembly can comprise a shape configured to secure a pin element disposed in or on a battery assembly. The hook assembly may comprise materials of suitable physical characteristics like tensile strength and weight. The hook assembly may comprise steel, aluminum, titanium, carbon fiber, a combination thereof, or another undisclosed material or combination thereof. In embodiments, the hook assembly can be mechanically coupled to shaft assembly 116. Said mechanical coupling may include, as non-limiting examples, rigid coupling (e.g. beam coupling), bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof.

According to embodiments, shaft assembly 116 can comprise opposite, opposing ends and may be disposed on or in receiver assembly 100 such that each end of the shaft assembly 116 is mechanically coupled to receiver assembly 100. In embodiments, shaft assembly 116 is mechanically coupled to receiver assembly 100 in a configuration that allows shaft assembly 116 to rotate about its length axis.

In embodiments, the hook assembly may be mechanically coupled to shaft assembly 116 so that the hook assembly may translate in a direction aligned with insertion opening 104 in response to shaft assembly 116 rotation. According to embodiments, the hooks can be configured to translate in a first direction in response to shaft assembly 116 rotating in a first direction. When the hooks are coupled to the pins of battery assembly, the translation of hooks further carry the battery assembly towards shaft assembly 116 and further into insertion opening 104. In other words, the hooks may carry the battery assembly a distance towards shaft assembly 116 and further into insertion opening 104. According to embodiments, when the hooks carry the battery assembly toward shaft assembly 116, the battery assembly may be configured to electrically couple to at least a portion of an eVTOL.

In embodiments, when the shaft rotates in a second direction, the hooks may translate in a second direction, carrying the battery assembly away from shaft assembly 116 and away from insertion opening 104. In other words, the hooks may carry the battery assembly a distance away from shaft assembly 116 and out of insertion opening 104. When the hooks carry the battery assembly away from shaft assembly 116 and out of insertion opening 104, the battery assembly may be configured to electrically decouple from at least a portion of the eVTOL aircraft.

The coupling between hook assembly and shaft assembly 116 is further described below with reference to FIG. 4. Shaft assembly 116 may be rotated manually or automatedly. In a manual embodiment, at least a portion of one end of shaft assembly 116 may extend past receiver assembly 100 and comprise a feature that may be captured by, or capture, crank 124. Crank 124 may provide mechanical advantage to a user while turning the crank, thus turning shaft assembly 116 and in turn translating hook assembly and therefore captured battery assembly in and out of insertion opening 104. In an embodiment, shaft assembly 116 may be rotated automatedly using a device that may impart force on an object like a brushed or brushless electric motor, internal combustion engine, rotary engine, servo motors or the like. Shaft assembly 116 may comprise materials of suitable rotational strength, for example steel, aluminum, titanium, carbon fiber, a combination thereof, or another undisclosed material or combination thereof. When the battery assembly changes distance relative to insertion opening 104, the battery assembly can be configured to engage/disengage electrical power to at least a portion of an eVTOL aircraft by electrically coupling/uncoupling battery assembly terminals with integral circuit 120 terminals.

In embodiments, receiver assembly 100 may comprise preloaded spring elements, not illustrated, configured to reduce aircraft-induced and otherwise present vibration at the battery assembly. Preloaded spring elements may comprise spring elements, as described below, that are mounted in any arrangement and alignment within a larger system in at least a partially compressed state. In embodiments, the spring elements can require compression before being installed in the overall assembly such that it applies a small amount of force to whatever moveable feature it is mechanically coupled to.

In an example embodiment, a preloaded spring element may be aligned between receiver assembly 100 and a battery assembly. The preloaded spring element can be configured to exert a force in equal and opposite directions acting on the receiver assembly 100 and a battery assembly. The presence of a relatively small force as compared to the weight of a battery assembly can reduce induced vibration of battery assembly within receiver assembly 100 by provided a counteracting force. Receiver assembly 100 may include spring elements where a spring element is defined as a mechanical actuator that may reduce momentum of receiver assembly 100, a battery assembly, or any combination thereof, such that oscillations are minimized and electrical connection from battery assembly to integral circuit 120 is maintained. A spring element may comprise a commonly held spring shape, such as a helix, or any combination of materials that take advantage of an elastic modulus or an otherwise undisclosed material property to effectively reduce or prevent oscillation.

In embodiments, the spring elements can include elastomeric spring elements which may comprise a polymer material with viscoelasticity and has weak intermolecular forces, a low Elastic Modulus, and a high failure strain. The ability for a spring element to reduce oscillation in a battery assembly receiver and battery assembly element system is paramount. The induced vibration from an aircraft operating may disconnect electrical connection from the battery assembly element to the battery assembly receiver, causing potentially dangerous situations for a user or aircraft.

According to embodiments, receiver assembly 100 comprises integral circuit 120. Integral circuit 120 is disposed in or on a surface of receiver assembly 100. In embodiments, integral circuit 120 is configured to provide power from a battery assembly to at least a portion of an eVTOL aircraft. In embodiments, integral circuit 120 can include power electronics including, but not limited to, rectifiers, inverters, linear regulators, boost converters, buck converters, buck-boost converters, flyback converters, transformers, or any combination thereof.

In embodiments, integral circuit 120 may comprise an electrical terminal. An electrical terminal may be configured to convey electrical energy to a mated/coupled electrical terminal. The electrical power conveyed from a battery assembly through the mated electrical terminals may power at least a portion of an eVTOL aircraft. In embodiments, the integral circuit 120 comprises a terminal having a first gender and is configured to mate with a terminal having a second gender. When the terminals are mated, the battery assembly is electronically coupled to integral circuit 120 and thus at least a portion of an eVTOL aircraft. The terminals of integral circuit 120 and their respective mates may comprise any material suitable for conducting electricity between them. Materials suitable for establishing an electrical connection may comprise an element known as a conductor, which is a material with the ability to allow electrical energy to move through it. Copper, silver, gold, certain steel alloys, aluminum and other similar materials with similar atomic structures may be used alone or in combination in integral circuit 120.

In embodiments, integral circuit 120 comprises a first connector configured such that when the hook assembly is retracted into receiver assembly 100 by the rotation of shaft assembly 116, a first terminal with a first gender mates mechanically and electrically couples with a second terminal with a second gender disposed on battery assembly. The first connector of integral circuit interface 120 may be disposed on an interior wall of receiver assembly 100, while the second connector, actuates along the same axis the battery assembly travels along at least the distance the cam forces the hook to travel. Outputs from sensor suite or any other component present within system may be analog or digital. Onboard or remotely located processors are capable of converting those output signals from sensor suite to a usable form by the destination of those signals. The usable form of output signals from sensor suite, through processor may be either digital, analog, a combination thereof or an otherwise unstated form. Processing may be configured to trim, offset, or otherwise compensate the outputs of sensor suite. Based on sensor suite output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components. Integral circuit interface 120 can be configured to withstand conditions associated with high-performance power systems, exemplary embodiments may include heat and electrical insulation sufficient to ensure proper electric power through all flight envelopes and power needs of an exemplary eVTOL aircraft.

Figure 2:
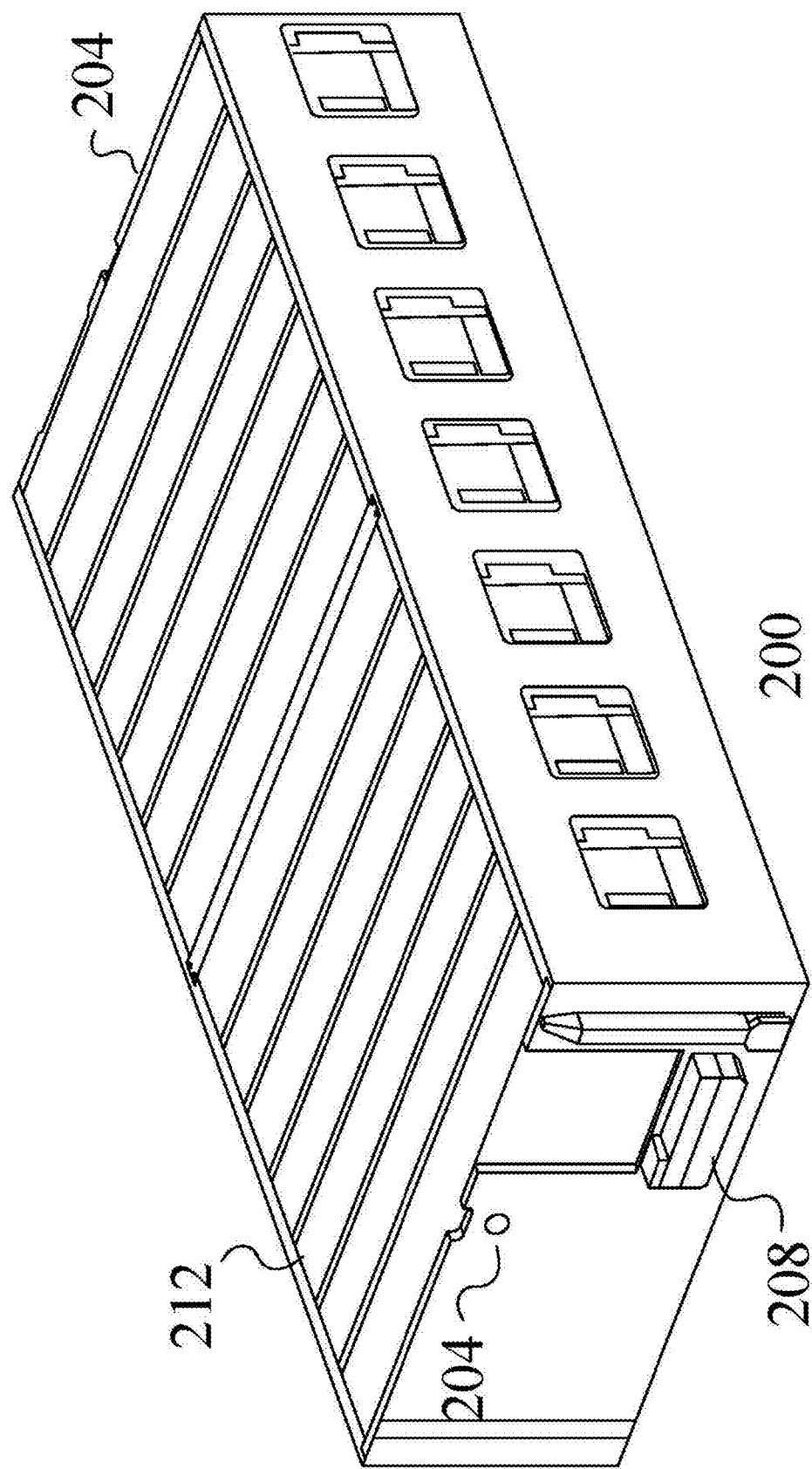
FIG. 2 is an isometric view illustrating a battery element, according to embodiments.

Referring now to FIG. 2, an isometric view of battery assembly 200 configured to be received by receiver assembly 100 is presented, according to embodiments. In embodiments, battery assembly 200 may comprise one or more battery elements 212 wired in series or parallel circuits and configured to store electrical energy and provide power. Each battery element 212 can include electrical energy that may be stored in potential chemical reactions, like an electrochemical fuel cell, or stored as an electrical charge, like a capacitor, a combination thereof, or one or a combination of other methods not disclosed herein.

In embodiments, battery assembly 200 can comprise a shape with one or more sides each having opposite, opposing surfaces with a first surfacing of a side forming a portion of an exterior of battery assembly 200 and a second surface of the side forming a portion of an interior of battery assembly 200. According to embodiments, battery assembly 200 comprises one or more pin elements 204 disposed on an exterior of battery assembly 200 with the one or more pin elements 204 configured to support the weight of battery assembly 200. For example, pin elements 204 can be configured to support the weight of battery assembly 200 while battery assembly 200 is secured in receiver assembly 100 in or on aircraft 300. In embodiments, pin element 204 may be oriented in a manner that only secures battery assembly 200 within receiver assembly 100 when battery assembly 200 and receiver assembly 100 are in an alignment suitable for electrical coupling. Pin element(s) 204 may comprise steel, aluminum, copper, titanium, carbon fiber, a combination thereof or one or more undisclosed materials and manufacturing processes or a combination, further configured to withstand force of at least gravity and additionally, resultant aerodynamic forces and moments on battery assembly 200 in the entire flight envelope of aircraft 300 in all power output levels of battery assembly 200.

Battery assembly 200 may comprise circuit interface 208 which may comprise a terminal. A terminal as detailed in this disclosure is a mechanical and electrical connection point configured to complete a circuit between battery assembly 200 and at least a portion of the power system of an eVTOL aircraft. The circuit interface 208, hereinafter called 'terminal', is disposed on, in, or otherwise comprised by battery assembly 200 and configured to complete an electrical connection when battery assembly 200 is aligned correctly in receiver assembly 100. The terminal 308 is disposed on battery assembly 200 in a manner that only allows electrical connection to eVTOL aircraft when purposefully engaged through use of receiver assembly 100, a hook assembly, and battery assembly 200.

In embodiments, terminal 208 may comprise any material suitable for establishing and maintaining a mechanical and electrical connection and transferal of electrical energy. Materials suitable for establishing an electrical connection may comprise an element known as a conductor, which is a material with the ability to allow electrical energy to move through it. Copper, silver, gold, certain steel alloys, aluminum and other similar materials with similar atomic structures may be used alone or in combination in terminal 208. The mechanical connection established and maintained by terminal 208 may be due to a press-fit connection configured to have one of either a male and female connector end, wherein the mating connector end has the opposite gender connector configured to mate and establish a connection. The terminal 208 is configured to only establish an electrical connection between battery assembly 200 and receiver assembly 100 once a mechanical connection is established. Physical contact between terminal 208 and corresponding terminal on integral circuit 120 is required and further configured that only a fully seated battery assembly 200 may complete the integral circuit and provide energy to exemplary aircraft 300.

In an exemplary embodiment, terminal 208 may mate and establish electrical connection with terminal disposed on battery assembly 200. With reference to FIG. 2, a boss is illustrated adjacent to terminal 208. This boss is configured to align battery assembly in receiver assembly in a suitable arrangement for securement and electrical connection. The boss illustrated here may be similar or the same to the boss described when disclosing guide assembly 108. The boss herein illustrated may mate up with a recessed channel disposed in or on receiver assembly that may align components.

Battery assembly 200 may incorporate provisions to dissipate heat energy present due to electrical resistance in integral circuit 208 and/or battery elements 212. Battery assembly 200 can comprise comprises one or more battery element modules wired in series and/or parallel. Battery assembly 200 may comprise mechanical design elements that one of ordinary skill in the art would recognize may thermodynamically dissipate heat energy away from battery assembly 200. The mechanical design may include, but is not limited to, slots, fins, heat sinks, perforations, a combination thereof, or another undisclosed element.

Heat dissipation may comprise material selection beneficial to move heat energy in a suitable manner for operation of battery assembly 200. Certain materials with specific atomic structures and therefore specific elemental or alloyed properties and characteristics may be selected in construction of battery assembly 200 or receiver assembly 100 to transfer heat energy out of a vulnerable location or selected to withstand certain levels of heat energy output that may potentially damage an otherwise unprotected component. One of ordinary skill in the art, after reading the entirety of this disclosure would understand that material selection may comprise titanium, steel alloys, nickel, copper, nickel-copper alloys such as Monel, tantalum and tantalum alloys, tungsten and tungsten alloys such as Inconel, a combination thereof, or another undisclosed material or combination thereof.

Heat dissipation may comprise a combination of mechanical design and material selection. The responsibility of heat dissipation may fall upon the material selection and design as disclosed above in regard to any component disclosed in this paper. The receiver assembly 100 may comprise similar or identical features and materials ascribed to battery assembly 200 in order to manage the heat energy produced by these systems and components.

According to embodiments, battery assembly 200 as discussed above may be shielded from electromagnetic interference. The battery assembly 200 and associated circuitry may be shielded by material such as mylar, aluminum, copper a combination thereof, or another suitable material. Battery assembly 200 and associated circuitry may comprise one or more of the aforementioned materials in their inherent construction or additionally added after manufacture for the express purpose of shielding a vulnerable component. Battery assembly 200 and associated circuitry may alternatively or additionally be shielded by location. Electrochemical interference shielding by location comprises a design configured to separate a potentially vulnerable component from energy that may compromise the function of said component. The location of vulnerable component may be a physical uninterrupted distance away from an interfering energy source, or location configured to comprise a shielding element between energy source and target component.

The shielding may comprise an aforementioned material in this section, a mechanical design configured to dissipate the interfering energy, and/or a combination thereof. The shielding comprising material, location and additional shielding elements may defend a vulnerable component from one or more types of energy at a single time and instance, or include separate shielding for individual potentially interfering energies.

Figure 3:
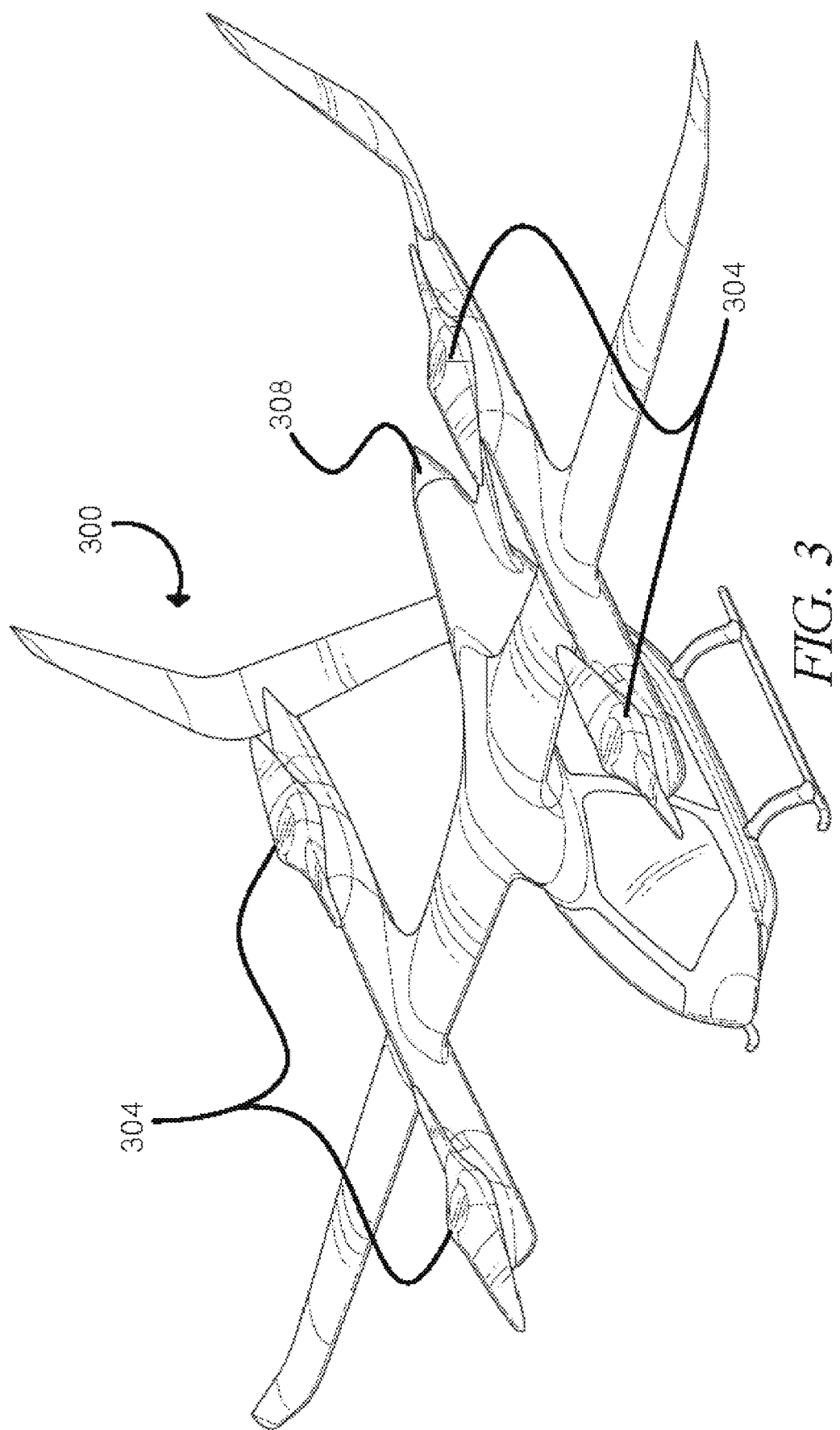
FIG. 3 is an isometric view illustrating an eVTOL aircraft, according to an example embodiment.

Referring now to FIG. 3, an isometric view of dual-mode aircraft 300 that may have receiver assembly 100 disposed in and/or on it and further configured to receive battery assembly 200 is presented. Dual-mode aircraft 300 can comprise an autonomous aircraft, a vertical take-off and landing aircraft, an electric take-off and landing aircraft, a quadcopter, a tilt-rotor aircraft, a fixed wing aircraft, a captured lift fan aircraft, a hovercraft, a combination thereof, or another aircraft not listed herein.

In embodiments, dual-mode aircraft may include vertical propulsor 304 and forward propulsor 308. Forward propulsor 308 can comprise a propulsor configured to propel dual-mode aircraft 300 in a forward direction. Forward in this context is not an indication of the propulsor position on aircraft 300. In embodiments, one or more forward propulsors 308 can be mounted on the front, on the wings, at the rear, etc. of dual-mode aircraft 300. Vertical propulsor 304 can comprise a propulsor configured to propel the aircraft in an upward direction. One of ordinary skill in the art would understand upward to comprise the imaginary axis protruding from the earth at a normal angle, configured to be normal to any tangent plane to a point on a sphere (i.e. skyward). In embodiments, vertical propulsor 304 may be mounted on the front, on the wings, at the rear, and/or any suitable location of aircraft 300. A "propulsor", as used herein, is a component or device used to propel a craft by exerting force on a fluid medium, which may include a gaseous medium such as air or a liquid medium such as water. In an embodiment, vertical propulsor 304 can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight. According to embodiments, forward propulsor 308 can comprise a propulsor positioned for propelling an aircraft in a "forward" direction. Here, forward propulsor 308 may include one or more propulsors mounted on the front, on the wings, at the rear, or a combination of any such positions. Forward propulsor can be configured to propel aircraft 300 forward for fixed-wing and/or "airplane"-style flight, takeoff and/or landing, and/or may propel the aircraft forward or backward on the ground.

In embodiments, vertical propulsor 304 and forward propulsor 308 may also each include a thrust element. A thrust element may include any device or component that converts mechanical energy of a motor, for instance in the form of rotational motion of a shaft, into thrust within a fluid medium. A thrust element may include, without limitation, a device using moving or rotating foils, including without limitation one or more rotors, an airscrew or propeller, a set of airscrews or propellers such as contra-rotating propellers, a moving or flapping wing, or the like. A thrust element may include without limitation a marine propeller or screw, an impeller, a turbine, a pump-jet, a paddle or paddle-based device, or the like. As another non-limiting example, a thrust element may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as a thrust element.

According to embodiments, vertical propulsor 304 and forward propulsor 308 may also include a motor mechanically coupled to a respective propulsor as a source of thrust. Said motor may include, without limitation, any electric motor that comprises a device to convert electrical energy into mechanical energy, such as, for instance, by causing a shaft to rotate. A motor may be driven by direct current (DC) electric power—for instance, a motor may include a brushed DC a motor, or the like. In embodiments, a motor may be driven by electric power having varying or reversing voltage levels, such as alternating current (AC) power as produced by an AC generator, inverter, and/or otherwise varying power, such as produced by a switching power source. In embodiments, a motor may include, without limitation, brushless DC electric motors, permanent magnet synchronous motor, switched reluctance motors, induction motors, or any combination thereof. According to embodiments, a motor may include a driving circuit such as electronic speed controllers and/or any other components for regulating motor speed, rotation direction, and/or dynamic braking (i.e. reverse thrust).

In embodiments, hook assembly 400 comprises one or more hooks 404, shaft element 408 (which may be similar to or the same as aforementioned shaft assembly 116), collar element 412, cam element 416, and an exemplary pin element 420 (pin element 420 may be similar to or the same as aforementioned pin element 204). In embodiments, hook assembly 400 is captured fully by receiver assembly 100 and can be configured to support the weight of battery assembly 200 during an entire flight envelope of an eVTOL aircraft, when taxiing, or on ground. Hook assembly 400 comprises materials suitable for supporting weight of battery assembly 200, which may include but is not limited to: steel alloys, carbon steel, titanium, carbon fiber, high-strength plastics, a combination thereof, or another undisclosed individual or combination of materials.

According to embodiments, hook 404 comprises a shape designed to capture pin element 420 and further configured to allow pin 420 to travel in a first direction toward a portion of receiver assembly 100 (e.g. shaft assembly 116) and a second direction away from a portion of receiver assembly 100 (e.g. shaft assembly 116). In an example embodiment, hook 404 may comprise a spring element that will return hook 404 to a secure position when pin 420 is fully captured by hook 404. The spring element may only be compressed while pin 420 is forcing hook 404 out of its way as it proceeds to a captured position. When pin 420 is in the captured position, hook 404 can be configured to not allow pin 420 to pass back through hook 404 in response to the force of gravity, one of ordinary skill in the art would understand the direction of gravity as 'down' toward the center of the earth.

In embodiments, shaft element 408 may be mechanically coupled to collar 412 and configured to rotate about its length axis while radially captured by collar 412. Shaft element 408 can be mechanically coupled to a first cam element 416 at a first end of shaft 408. Shaft 408 and cam 416 may be configured to be rotatable about shaft's 408 long axis. Cam 416 may comprise a circular cross section and may be coupled to shaft 408 at a point away from its radial center. The rotation of shaft 408 may in turn rotate cam 416.

According to embodiments, cam 416 can further mechanically couple to hook 404. Hook 404 comprises a coupling that allows cam 416 to rotate within a receptable disposed on a first end of hook 404. The rotation of cam 416 from shaft 408 further drives a reciprocating motion in hook 404. Hook 404 is further configured to receive and latch on to exemplary pin element 420. When exemplary pin element 420 is secured within hook 404, the reciprocating motion moves battery assembly 200, which is mechanically fixed to and supported by exemplary pin element 420 to move in a direction toward a portion of receiver assembly 100 (e.g. towards shaft assembly 116 or further into insertion opening 104). Once battery assembly 200 and receiver assembly 100 are sufficiently close, integral circuit 120 may mate with terminal 208 and complete a circuit sufficient to convey power to at least a portion of an eVTOL aircraft. Shaft 416 may rotate in an opposite direction and therefore move hook 404 and therefore battery assembly 200 with it, decoupling the electrical circuit and depowering at least a position of an eVTOL aircraft by moving battery assembly 200 a distance away from a portion of receiver assembly 100 (e.g. shaft assembly 116 or out of insertion opening 104).

According to embodiments, receiver assembly 100, battery assembly 200 and hook assembly 400 work in tandem to rapidly raise and lower battery assembly 200 in and out of aircraft and are further configured to engage and disengage electric power to at least a portion of the eVTOL aircraft. One of ordinary skill in the art would understand directionally that "in" and "raise" to be synonyms, exactly as "out" and "lower" are. It should also be understood that an electrical connection between the mating elements, a first disposed on receiver assembly and a second disposed on battery assembly 200 are both configured so that an electrical connection suitable for conveying electrical power from battery assembly 200 to at least a portion of the eVTOL aircraft is made only when battery assembly 200 is at its inmost position. The actuation of battery assembly 300 down and away from stationary receiver assembly 100 mechanically separates the electric circuit created between the battery assembly 200 and receiver assembly 100 which disengages electrical power from at least a portion of an eVTOL aircraft.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 6 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 344, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention

What is claimed is:

1. A system for securement and disengagement of a battery assembly power source element for an electric vertical take-off and landing eVTOL aircraft comprising: the battery assembly configured to mechanically couple to the eVTOL aircraft and comprising: a battery element having opposite, opposing surfaces and configured to provide power to at least a portion of the eVTOL aircraft; and a pin element disposed on a surface of the battery assembly; and a receiver assembly disposed on the eVTOL aircraft and configured to mechanically couple the battery assembly to the eVTOL aircraft, wherein the receiver assembly comprises: an insertion opening disposed a distance away from the battery assembly and having a size configured to receive the battery assembly; and a hook assembly comprising: a hook configured to mechanically couple to the pin element of the battery assembly; a cam mechanically coupled to the hook; and a shaft mechanically coupled to the cam, wherein the shaft is configured to drive the hook such that the distance between the insertion opening and the battery assembly is changed.

2. The assembly of claim 1, wherein the hook is driven by the rotation of the shaft.

3. The assembly of claim 1, wherein the shaft is further configured to change the distance between the insertion opening and the battery assembly.

4. The assembly of claim 1, further comprising a crank mechanically coupled to the shaft and configured to drive the shaft.

5. The assembly of claim 1, further comprising a motor mechanically coupled to the shaft and configured to drive the shaft.

6. The assembly of claim 1, wherein the pin element is spring loaded.

7. The assembly of claim 1, wherein the hook is spring loaded.

8. The assembly of claim 1, wherein the battery element comprises a terminal of a first gender disposed on a surface of the battery element.

9. The assembly of claim 8, wherein the receiver assembly comprises a terminal of a second gender configured to mate with the terminal of the first gender.

10. A method for securement and disengagement of a battery assembly power source element for an electric vertical take-off and landing eVTOL aircraft comprising: coupling a hook assembly disposed on the eVTOL aircraft to a pin of the battery assembly, wherein the battery assembly comprises a battery element configured to provide power to at least a portion of the eVTOL and wherein the battery assembly is disposed a first distance away from the hook assembly; and rotating a shaft of the hook assembly in a first direction, wherein rotating the shaft of the hook assembly in the first direction comprises: moving the battery assembly to a second distance away from the hook assembly, wherein the first distance is a greater distance than the second distance; and electronically coupling the battery element to the eVTOL.

11. The method of claim 10, further comprising rotating the shaft of the hook in a second direction.

12. The method of claim 11, wherein rotating the shaft of the hook in the second direction comprises:
moving the battery assembly to a third distance away from the hook assembly, wherein the third distance is a greater distance than the second distance; and
electronically uncoupling the battery element from the eVTOL.

13. The method of claim 12, wherein electronically uncoupling the battery element from the eVTOL comprises unmating a first terminal disposed on the battery assembly from a second terminal.

14. The method of claim of claim 10, wherein the hook assembly comprises one or more hooks configured to couple to the pin.

15. The method of claim 14, wherein rotating the shaft of the hook in the first direction further comprises driving a hook coupled to the pin.

16. The method of claim 14, wherein the one or more hooks are spring loaded.

17. The method of claim 10, wherein electronically coupling the battery element to the eVTOL comprises mating a first terminal disposed on the battery assembly to a second terminal.

18. The method of claim 10, wherein rotating a shaft of the hook assembly in the first direction comprises rotating a crank coupled to the shaft in the first direction.

19. The method of claim 10, wherein the pin is spring loaded.

20. The method of claim 10, wherein rotating a shaft of the hook assembly in the first direction comprises rotating a cam of the hook assembly.

* * * * *